INVENTOR
ALBERT W. FRIEND

Dec. 15, 1959     A. W. FRIEND     2,917,438
ELECTRICAL COMPONENT AND MANUFACTURE
Original Filed April 21, 1955     3 Sheets—Sheet 2
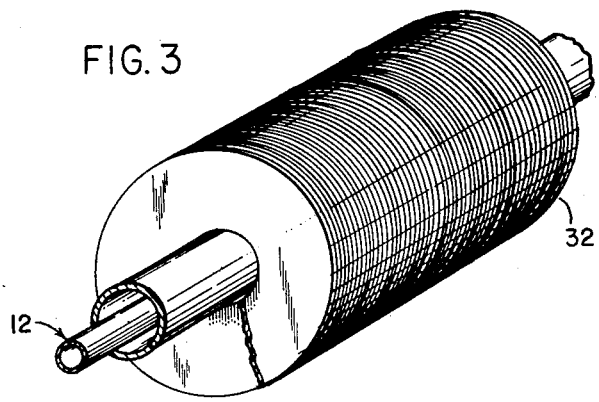
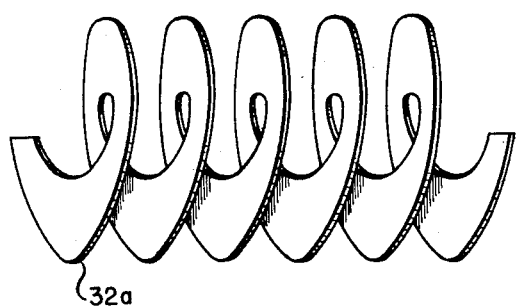
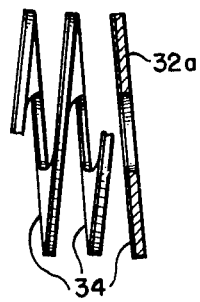
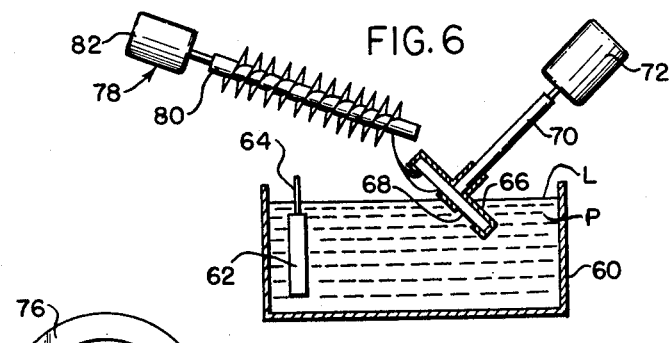
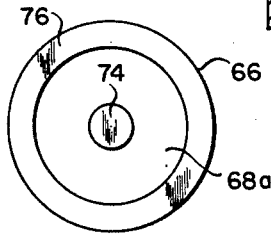
INVENTOR
ALBERT W. FRIEND ature of being able to fabricate them of a light material such as aluminum. While it is possible to produce such helices by winding a foil strip on edge around a mandril, a great advantage is obtained by the formation of the helix directly as an electrodeposit, avoiding the stress developed by the edge-winding operation and the initial formation of a strip which is wound.

United States Patent Office
2,917,438
Patented Dec. 15, 1959

2,917,438
ELECTRICAL COMPONENT AND MANUFACTURE

Albert Wiley Friend, Bala-Cynwyd, Pa., assignor, by mesne assignments, to Sylvania Electric Products Inc., Wilmington, Del., a corporation of Delaware Original application April 21, 1955, Serial No. 502,763, now Patent No. 2,897,397, dated July 28, 1959. Divided and this application September 30, 1958, Serial No. 768,819

3 Claims. (Cl. 204—13)

The present invention relates to a method and apparatus for the continuous production of edge-wound metallic helices and in particular is concerned with an improved method for manufacturing electromagnetic focusing coils for traveling wave tube amplifiers and like devices, and to improvement in the physical and operational characteristics of such devices. This application is a division of application Serial No. 502,763, filed April 21, 1955, and now Patent No. 2,897,397.

In the manufacture of electrical conductors and components it has long been known to produce impurity free wires by a process of electrodeposition which involves the plating of metal onto a traveling cathode surface and the stripping of the metal from said cathode surface. For example, in the manufacture of thin metal foils, it is commonplace to support a drum-like cathode such that a portion of its periphery is immersed within an appropriate electrolyte containing the metal ion. In operation the metal is deposited on that peripheral portion of the cathode which is immersed in the electrolyte or plating solution and as the cathode rotates, a deposit builds up to a desired thickness. Mechanisms are provided for continuously stripping the deposited metal from the periphery of the cathode and for rolling the foil up in any convenient manner. The metal foil so produced may be of gold, silver, copper, nickel or any metal or alloy which may be electrochemically deposited on a cathode.

It is broadly an object of the present invention to provide an improved method and apparatus for electroforming a thin, continuous metallic strip. Specifically, the present invention is concerned with the formation of an edge-wound helix of deposited metal including successive flat surfaced turns spiraling about a reference line with the flat surfaces of the turns substantially at right angles to the reference line.

Certain aspects of the invention may be best appreciated by considering its application to the manufacture of traveling wave tubes and like devices containing one or more electron beams which must be confined to flow within accurately defined boundaries. Such traveling wave tube devices usually include an electron gun, similar to those commonly found in cathode ray tubes, which forms and projects an electron beam axially within a metal electrode assembly arranged concentrically of and within a vitreous supporting envelope. The electrode assembly includes an input probe, an output probe spaced from the input probe and a helical conductor or coil connected between the probes. An input signal is supplied to the input probe and during travel along the helical conductor interacts with the electron beam, resulting in amplification of a broad band of input frequencies which are extractable at the output probe of the electrode assembly. There are two principal types of electron guns which may be used to provide the desired electron beams. In the "parallel flow" type of gun, the axial magnetic field passes through the gun and guides the electron along the field as the electrons leave the cathode, pass through the electron gun and travel down the electrode assembly. In the "converging or conical flow" type of gun, the emitted electrons are converged by electrostatic fields which produce a dense beam of axially moving electrons at an external plane where the beam abruptly enters into an axial magnetic field which then serves to maintain the beam in focus during its passage through the electrode assembly. Beam focus in either instance may be obtained by a large single permanent magnet or by a solenoid. For certain applications, including very high current density and high voltage beam of medium and high power traveling wave tubes, it is essential to employ electromagnetic focusing structures to furnish very strong magnetic fields to produce adequate focus.

Solenoids heretofore employed, have usually included a spool having an inside diameter appropriate to slip over the supporting envelope of the electrode assembly or over the gun in the case of the parallel flow arrangement. The spool has wound thereon a great many turns and layers of appropriate magnet wire. When employing such solenoids, it is important that the winding be applied in a uniform manner to assure uniformity in the focusing field and that the supporting spool be sufficiently rigid to avoid deviation of the electron beam from the desired axial path of travel. As a practical matter, such solenoids have been found to be quite heavy and capable of producing only relatively weak magnetic fields. Further, the fields of such solenoids have been found to extend to surrounding spaces, thus requiring shielding to preclude interference with the function of adjacent electronic apparatus.

Attempts to obtain higher field strength with such structures have led to excessive heating of the winding and the need for forced cooling. In an attempt to construct lightweight, high field strength solenoids with capacity to remove head produced as a result of the electric current required to produce the high field strength, it has been suggested that the solenoid take the form of a layer of wound foil of one turn per layer. This approach appears to be an improvement over the conventional wire-wound solenoid, which has a very poor path for the conduction of heat to the outer surface, in that heat may be extracted from the edges of the successive layers. However, as a practical matter, the layer wound arrangement falls short of an optimum structure which is of low mass, light weight and capable of producing high field strengths at low power consumption and with minimum cooling problems.

Accordingly, it is a further object of the present invention to provide an improved solenoid for focusing an electron beam. Specifically, it is within the contemplation of the present invention to provide improved traveling wave devices of high power having light, and high field strength solenoids for focusing the electron beam of the device.

In accordance with this illustrative aspect of the invention, there is provided in combination with a traveling wave tube including an electron gun for projecting a beam of electrons along a predetermined path, an electromagnetic focusing means which surrounds said path and includes an edge-wound metal helix.

The use of such edge-wound helix solenoids for electromagnetic focusing offers numerous advantages, particularly when compared to comparable layer-wound coils of either wire or foil. Outstanding among these advantages are the substantial reduction in required electric power (see Fig. 8), the ease of conduction of heat radially to the outer periphery of the solenoid across the radial extent of the respective turns, and the further heat conduction path afforded along the entire inner and outer cylindrical surfaces of the edge-wound helix. Apart from the substantial reduction of maximum winding temperature and the reduction of the weight of the solenoid, itse power source and its cooling system, the edge-wound helix may be supported entirely from the outside surface. This facilitates reduction of the inner diameter of the solenoid to one fitting closely over the traveling wave tube, thus further contributing greatly to reduction in size, weight and required operating power, since, to maintain the same power input when the inside diameter is changed, the ratio $r_2/r_1$ of outer to inner radius must be maintained constant.

The edge-winding of helices embodying features of the present invention by known mechanical forming techniques is especially difficult, particularly if the radial width of the helix is large compared to the thickness of the respective helix turns, or when the inside winding diameter is small in comparison to the radial extent of the turns. In accordance with further aspects of the present invention, the edge-wound helix is formed by electroforming or vacuum evaporation processes.

The above objects, brief description and still further features and advantages of the present invention will be best appreciated by reference to the following detailed description of presently preferred apparatus, processes, and devices embodying features of the invention, when taken in conjunction with the accompanying drawings, wherein:

Fig. 3 is a fragmentary perspective view of the helix assembly of Fig. 1;

Fig. 4 is a fragmentary perspective view of a segment of the helix of Fig. 3 with the respective turns spread apart;

Fig. 5 is a fragmentary elevational view, with parts broken away and sectioned for the purpose of clarity, of the spread-apart helix of Fig. 4;

Fig. 6 is a somewhat schematic elevational showing of preferred apparatus for preparing electroformed edge-wound helices;

Fig. 7 is a plan view of a rotatable cathode disc incorporated in the apparatus of Fig. 6.

Preliminary to a detailed discussion of the illustrative embodiments, process and apparatus set forth hereinafter, all of which apply specifically to focusing coils for the electron beams of traveling wave tube devices, it is to be stressed that the process and apparatus of the present invention, and coils obtained according to the present invention, find more generalized application. However, in that the various features of the invention may best be illustrated and find exceptionally important application in the construction of traveling wave tubes, the description hereinafter will be specifically directed to this aspect of the invention.

Figure 1:
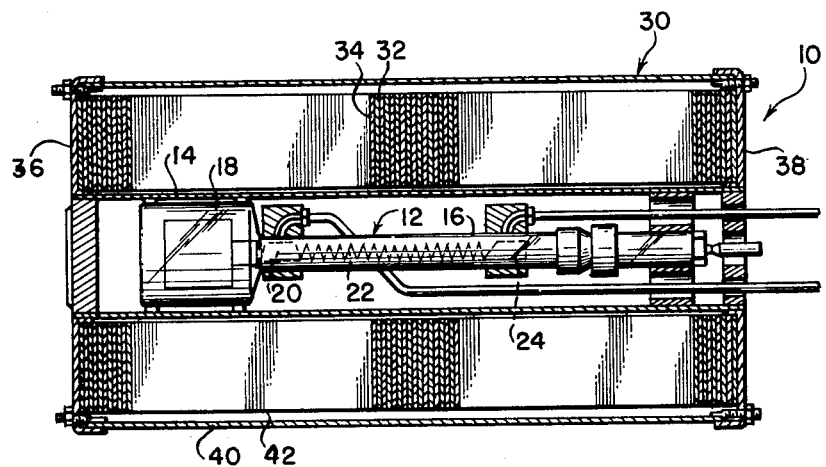
Fig. 1 is an elevational view of an edge-wound focusing solenoid according to the present invention, shown surrounding a traveling wave tube device incorporating a "parallel flow" electron gun.

In Fig. 1 there is shown an illustrative traveling wave tube 10 which includes a vitreous body 12 having an enlarged bulb end 14, and an elongated slender sleeve or tube 16. Within the bulb or enlarged end 14 is the well known "parallel flow" gun assembly 18 which is arranged to produce a beam to be axially directed along the sleeve 16. Within the sleeve 16 is an electrode assembly including an input probe 20, a helical conductor 22 of uniform or variable pitch having one end electrically connected to the input probe 20, and an output probe 24 electrically connected to the other end of the helix. Beyond the output probe 24 is a collector (not shown) for the electron beam having appropriate external connections. As is well understood, operating potentials are provided to the several components of the traveling wave tube.

In accordance with one aspect of the present invention, the traveling wave tube envelope including the bulb end 14 and the sleeve 16 containing the electrode assembly is enveloped within an electromagnetic focusing device 30 including an edge-wound helix 32 having successive flat surfaced turns 32a of uniform pitch spiraling about a reference line concentric with the beam axis, with the flat surfaces of the respective turns at substantially right angles to the reference line. The edge-wound helix 32 is of deposited metal, prepared by electroforming or vacuum deposition. Materials suitable for the edge-wound helix include copper, which may be plated out of a somewhat conventional and easily handled electrolyte containing the copper ion, or aluminum, which may be plated out from an anhydrous bath of organic chemical nature. Separating the respective turns of the edge-wound helix 32 is insulation 34 which may take the form of an oxidized metal surface of the helix itself, synthetic organic or silicone coatings formed on the helix or fused vitreous coatings.

The helical coil 32 with the insulation 34, is clamped together with the respective turns in abuting relation and of uniform spacing throughout the length of the coil by the use of ferromagnetic end plates 36, 38 which also serve as the pole pieces of the magnet. An outer ferromagnetic cylinder 40 is connected between the respective end plates 36, 38 and if desired, may serve as a tensioning member and a cooling air retainer. As seen in Fig. 1, there is an annular space 42 about the outer periphery of the helical coil 32 in which cooling air may be confined for extracting the heat from each individual turn of the helix through the many radial conducting paths afforded by the helix turns which extend from the inner periphery of the coil to the outer periphery. Additional cooling air may be passed longitudinally through the solenoid bore and around the traveling wave tube envelope 12 to cool the tube and the inner periphery of the coil.

Figure 2:
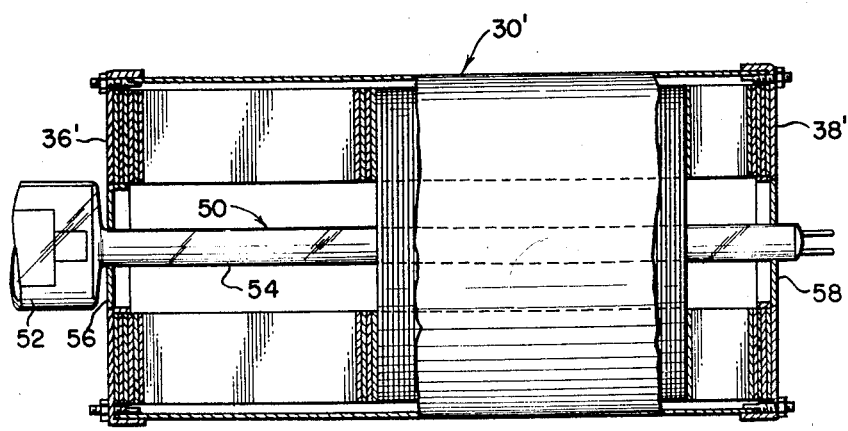
Fig. 2 is an elevational view of an edge-wound focusing solenoid according to the present invention, shown surrounding a traveling wave tube device incorporating a "converging flow" type of electron gun.

In Fig. 2, there is shown a further application of the edge-wound focusing helix as specifically applied to a traveling wave tube 50 incorporating a "converging or conical" flow type of gun 52. As is well understood in the art, this type of gun produces a dense beam of axially moving electrons at an external plane where the beam should abruptly enter into an axial magnetic focusing field. This magnetic field maintains the beam in focus during its passage through the high frequency interaction structure. To this end, an electromagnetic focusing device 30' which is essentially the same as the focusing device 30, envelopes the slender tubing 54 of the traveling wave tube device 50, but does not extend about the gun 52. Plates 56, 58 which serve as shields and supports for the tube envelope 54 are seated within the end plates 36', 38' of the focusing coil 30'. Plate 56 may form a portion of the vacuum envelope of the tube.

In either of the forms illustrated in Figs. 1 and 2, the edge-wound helical solenoid provides an essentially uniform magnetic field, thus assuring uniform focusing and smooth flow of the electron beam. The edge-wound helical solenoid is eminently suitable for the provision of strong magnetic field required to focus the high current density, high-voltage beam of medium and high power traveling wave tubes.

In Figs. 3 to 5 inclusive, there is shown an edge-wound helix 32 which is incorporated in the focusing coil or solenoid 30. As previously pointed out, the respective turns 32a of the helix are separated by insulation 34 on the flat faces of the helix. With the turns 32a abutting each other but insulated by the respective layers of very thin insulation 34, as illustrated in Fig. 3, there is formed a continuous inner bore of substantially uniform diameter throughout the length of the helix. The inner bore diameter may be selected to fit snugly about the bulb end 14 of the traveling wave tube envelope 12, as illustrated in Fig. 1. In the alternative, the inner diameter of the helix may be selected to fit with clearance about the sleeve 50 of the traveling wave device 54, as illustrated in Fig. 2.

In accordance with a preferred form of the present invention, the helix illustrated in Figs. 3 to 5 and incorporated in devices of the type shown in Figs. 1 and 2, is electroformed by apparatus shown in Figs. 6 and 7. Such apparatus is seen to include a tank or container 60 containing a plating solution P to a predetermined level L. Extending into the plating solution P is an anode 62 connected by a lead 64 to an appropriate plating supply. Disposed in a plane inclined to the horizontal and to the level or surface L is a rotatable cathode disc 66 including a planar face 68. The cathode disc 66 is supported on a shaft 70 driven at constant speed by a motor 72 energized from an appropriate source (not shown). The planar face 68 of the rotatable cathode disc 66 is stopped off as indicated at 74, 76 to provide an exposed annular band 68a of the annular surface 68. As is well understood in the art, the exposed surface 68a is electrolytically treated and highly polished to place it in condition for continuous non-adherent plating and continuous clean stripping. Disposed at an angle to and spaced above the rotatable disc 66 is a storage device 78 which includes a mandrel 80 and a drive motor 82. The mandrel 80, which is constructed to accommodate successive turns of the helix as the same are stripped from the cathode 66, is driven by the motor 82 at a speed synchronized to the rotation of the cathode 66 such as to receive successive turns of the helix.

In practicing the electroforming of the helix, the rotatable cathode disc 66 is fabricated of stainless steel. Preliminary to setting up the apparatus of Fig. 6, the cathode is passivated by making the same an anode in a hot alkaline electrocleaning solution. This treatment removes oily matter from the stainless steel cathode in addition to forming a thin passive film which prevents adhesion of the electroformed metal during plating and assures continuous clean stripping. Following the anodic treatment, the stainless steel cathode is rinsed in water to remove the alkaline solution. Of course care must be exercised to prevent abrasion of the surface subjected to passivation, which abrasion would tend to destroy the passive film and result in the adhesion of plated metal. If the metal helix is to be of copper, a suitable electrolyte is an aqueous solution containing approximately 336 grams per liter of copper fluoborate. Such electrolyte may be operated at a pH of between .5 and .7 with vigorous agitation with a copper anode operating at a bath temperature of 90° F. With a plating current of approximately 5 amperes, it is possible to form approximately six helix turns per hour having an outer diameter of three inches, an inner diameter of one inch, and a thickness of .002 of an inch.

As seen in the schematic showing of Fig. 6, approximately a one-half segment of the rotatable cathode surface 68a is immersed in the plating solution P. It has been found that the exposure to air of slightly less than one-half of the cathode surface during each revolution is an aid to maintaining the passive character of the cathode surface. Of course, it is to be understood that the details of the electroforming operation are subject to a latitude of variation within the skill of those in the art. The deposited metal helix has its respective turns insulated from each other, for example, by the application of synthetic, organic or silicone coatings to one of the continuous spiraling surfaces.

The present method may be used for the purposes of plating aluminum into a continuous edge-wound helix by the use of an appropriate anhydrous bath. For a description of the techniques of electrodepositing aluminum, reference may be made to an article by D. E. Couch and A. Brenner entitled "Electrodeposition of Aluminum," appearing in "The Journal of the Electrochemical Society," vol. 99, No. 6, pages 234 to 244, of June 1952. When the deposited metal helix is of aluminum an insulating layer between the respective turns is provided by anodizing the aluminum helix. Such anodizing, which may be achieved in accordance with known techniques, results in a tough adherent insulating coating on the surface of the aluminum for isolating the respective turns.

It is likewise within the contemplation of the invention to deposit the metal of the edge-wound helix, and its insulation by a continuous vacuum evaporation and deposition method. Such methods are well known to the art of manufacturing lenses having thin continuous metallic coatings and accordingly will not be detailed herein. Accordingly, the term "deposited" employed in the appended claims should be afforded a latitude of interpretation consistent with the electroforming or cathode depositing of the metal of the helix or the vacuum depositing of such metal onto a rotating annular surface.

Figure 8:
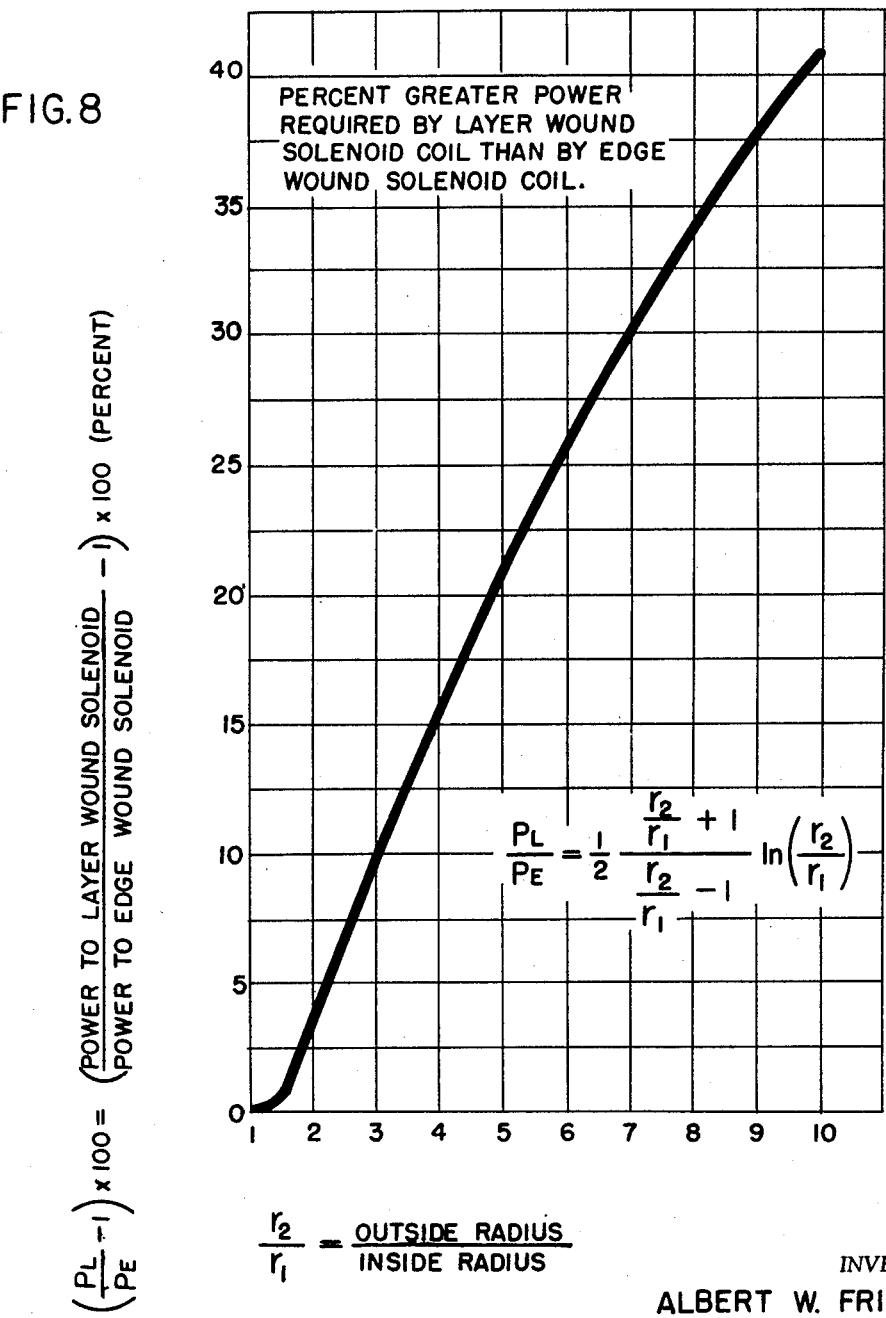
Fig. 8 is a graph showing in percentages the power requirement for a layer wound solenoid coil as compared to an edge-wound solenoid coil for the same coil space factor, conductor materials, size and shape.

From the foregoing, it will be appreciated that edge-winding of the successive turns of a solenoid allows for the design of the focusing coil for an electron beam of lower power consumption than comparable layer winding of wire or metal coil. Further, edge-wound solenoids allow for maximum heat dissipation per unit volume in comparison with layer wound foil and wire coils, and in particular facilitates the application of refractory insulating materials, as by spray coating or by rendering surface areas non-conductive. Still further, edge-wound solenoids facilitate obtaining and maintaining a uniform current distribution along the solenoid axis in that the pitch of the successive turns may be controlled to great accuracy by precision deposition of the metal followed by careful assembly. Still further, a uniform axial field may be obtained with an edge-wound solenoid in that no serious problem is encountered in termination of the conductors. This is an important advantage as compared to the broad layer wound coils which must include a current lead to the inner turn, the current lead being coaxial with the electron beam and in good contact with the foil along its length to minimize stray currents which may produce spurious transverse magnetic field and poor focusing throughout the length of the beam. Still further, edge-wound helices provide a means for obtaining comparatively low system weight and power consumption, of prime importance in air-borne application of traveling wave devices. For a comparison of power requirements for a layer wound coil and a comparable edge wound coil reference may be made to the graph of Fig. 8.

Further modifications and various applications of the foregoing invention will occur to those skilled in the art, and accordingly the appended claims should be construed broadly, as is consistent with the spirit and scope of the present invention.

What I claim is:

1. The method of producing a metal helix including the steps of partially submerging an annular cathode surface into a plating solution, depositing metal onto said annular cathode surface while turning said annular cathode surface about an axis concentric with the center of said annular cathode surface, and continuously stripping the band of deposited metal from said annular cathode surface.

2. The method of producing a copper helix including the steps of partially submerging an annular cathode surface into a plating solution containing copper ions, depositing copper onto said annular cathode surface while turning said annular cathode surface about an axis concentric with the center of said annular cathode surface, and continuously stripping the band of deposited copper from said annular cathode surface.

3. The method of producing a metal helix including the steps of partially submerging an annular cathode surface into a plating solution, depositing metal onto said annular cathode surface while turning said annular cathode surface, and continuously stripping and storing the band of deposited metal from said annular cathode surface.

References Cited in the file of this patent

UNITED STATES PATENTS

| | | |
|---|---|---|
| 359,349 | Daniels | May 15, 1887 |
| 381,655 | Stover | Apr. 24, 1888 |
| 395,684 | Baker | Jan. 8, 1889 |
| 1,254,056 | Moore | Jan. 22, 1918 |
| 1,850,936 | Lane et al. | Mar. 22, 1932 |
| 1,959,376 | Lucas | May 22, 1934 |

FOREIGN PATENTS

| | | |
|---|---|---|
| 668,338 | Great Britain | Mar. 12, 1952 |